(12) United States Patent
Wahlqvist et al.

(10) Patent No.: US 12,007,404 B2
(45) Date of Patent: Jun. 11, 2024

(54) SAMPLE ACQUIRING DEVICE HOLDER FOR A HOUSING OF AN ANALYSIS APPARATUS

(71) Applicant: HemoCue AB, Angelholm (SE)

(72) Inventors: Caroline Wahlqvist, Angelholm (SE); Patrik Jonsson, Angelholm (SE); Ola Wernersson, Angelholm (SE)

(73) Assignee: HemoCue AB, Angelholm (SE)

( * ) Notice: Subject to any disclaimer, the term of this patent is extended or adjusted under 35 U.S.C. 154(b) by 607 days.

(21) Appl. No.: 16/761,955

(22) PCT Filed: Nov. 7, 2018

(86) PCT No.: PCT/EP2018/080385
§ 371 (c)(1),
(2) Date: May 6, 2020

(87) PCT Pub. No.: WO2019/091993
PCT Pub. Date: May 16, 2019

(65) Prior Publication Data
US 2021/0181225 A1 Jun. 17, 2021

(30) Foreign Application Priority Data

Nov. 9, 2017 (SE) .................................. 1730309-0

(51) Int. Cl.
*G01N 35/10* (2006.01)
*B01L 3/00* (2006.01)

(52) U.S. Cl.
CPC .......... *G01N 35/1081* (2013.01); *B01L 3/508* (2013.01); *B01L 2200/025* (2013.01); *B01L 2200/10* (2013.01)

(58) Field of Classification Search
CPC ............... G01N 35/1081; G01N 21/13; G01N 2021/135; B01L 3/508; B01L 2200/025;
(Continued)

(56) References Cited

U.S. PATENT DOCUMENTS

| 3,619,073 A | 11/1971 | De Mendez et al. |
| 3,977,794 A * | 8/1976 | Liedholz .................. B01L 9/06 356/244 |
| 2013/0033708 A1 * | 2/2013 | Lee .................. G01N 35/00584 73/864.91 |

FOREIGN PATENT DOCUMENTS

| DE | 10 2007 059167 | * 12/2007 |
| DE | 10 2007 059 167 A1 | 6/2009 |

(Continued)

OTHER PUBLICATIONS

International Search Report for International Application No. PCT/EP2018/080385, dated Feb. 5, 2019 (two pages).

(Continued)

*Primary Examiner* — Benjamin R Whatley
*Assistant Examiner* — Jacqueline Brazin
(74) *Attorney, Agent, or Firm* — FINNEGAN, HENDERSON, FARABOW, GARRETT & DUNNER, LLP (57) ABSTRACT

The invention relates to a sample acquiring device holder (3) for a housing (2) of an analysis apparatus (1). The sample acquiring device holder (3) may comprise an activating element (5) and a reception recess (11) for receiving a sample acquiring device (4). A first portion (10) of the activating element (5) may protrude into the reception recess (11), if the activating element (5) is in a non-activating position. The activating element (5) may be adapted to be moved into an activating position by the sample acquiring device (4), if the sample acquiring device (4) is inserted into an intended measurement position within the reception recess (11). The activating element (5) may be adapted to activate a measurement triggering element (15), if the activating element (5) is in its activating position, such that the (Continued)

measurement triggering element (15) activates a measurement of the analysis apparatus (1).

16 Claims, 7 Drawing Sheets

(58) Field of Classification Search
CPC ......... B01L 2200/10; B01L 2300/0809; B01L 9/065; B01L 9/06
USPC .......................................................... 436/50
See application file for complete search history.

(56) References Cited

FOREIGN PATENT DOCUMENTS

| | | | |
|---|---|---|---|
| EP | 2 434 291 A1 | | 9/2010 |
| SE | 1451074 | * | 4/2016 |
| SE | 1451074 A1 | | 4/2016 |

OTHER PUBLICATIONS

Written Opinion of the International Searching Authority for International Application No. PCT/EP2018/080385 (six pages).

* cited by examiner

SAMPLE ACQUIRING DEVICE HOLDER FOR A HOUSING OF AN ANALYSIS APPARATUS

This application is a national stage filing under 35 U.S.C. § 371 of International Application No. PCT/EP2018/080385, filed on Nov. 7, 2018, which claims priority of Swedish Patent Application No. 1730309-0, filed on Nov. 9, 2017. The contents of these applications are each incorporated herein by reference.

FIELD OF THE INVENTION

The invention relates to a sample acquiring device holder to be inserted into a housing of an analysis apparatus. Furthermore, the invention relates to an analysis apparatus comprising the aforesaid housing and sample acquiring device holder, wherein the analysis apparatus may be adapted to conduct a quantitative hemoglobin determination in undiluted, unhemolyzed whole blood. Additionally, the invention relates to a method for analysing a blood sample which is stored within a sample acquiring device.

BACKGROUND OF THE INVENTION

It is known to collect a blood sample from a vein in an arm or a finger tip into a sample acquiring device. Typically, the sample acquiring device may be a microcuvette comprising two interspaced transparent plates, and the blood sample may be stored within the plates. The sample acquiring device may be inserted into a blood analysis apparatus for analysis such as hemoglobin determination, blood glucose determination or white blood cell count.

SE 538371 C2 discloses a type of a sample acquiring device holder, which is intended to be pushed into an analyzer and then to be pushed slightly to open it again.

Other analysis apparatuses are known which comprise a sample acquiring device holder. Typically, an operator of such analysis apparatuses has to open up the holder, put the sample acquiring device in the designated place on the holder, then close the holder, wait for measurement to be made, open the holder again and remove the sample acquiring device from the holder. This procedure may be acceptable, if the measurement time is e.g. 10-60 seconds long. In this case it may be acceptable to add the time for opening and closing the holder and put down the sample acquiring device.

There is a need to shorten measurement durations and speed is thus essential. Especially, a measurement duration less than 1 second is desirable. Also, there is a need to remove the risk of starting a measurement by accident, if the sample acquiring device itself is activating a measurement activation button. Thus, there is a requirement that the measurement does not start unless the sample acquiring device is in a correct position.

SUMMARY OF THE INVENTION

It is an object of the present invention to provide a sample acquiring device holder, an analysis apparatus and a method for analysing a blood sample being stored within a sample acquiring device which shorten the measurement duration and which contribute to avoid an unintended activation of a measuring.

The problem is solved by the subject matter according to the independent claims. The dependent claims, the following description and the drawings show preferred embodiments of the invention.

According to a first aspect of the invention, a sample acquiring device holder for a housing of an analysis apparatus is provided. The sample acquiring device holder can comprise an activating element and a reception recess for receiving a sample acquiring device. A first portion of the activating element can protrude into the reception recess, if the activating element is in a non-activating position. The activating element can be adapted to be moved into an activating position by the sample acquiring device, if the sample acquiring device is inserted into an intended measurement position within the reception recess. Furthermore, the activating element can be adapted to activate a measurement triggering element, if the activating element is in its activating position, such that the measurement triggering element activates a measurement of the analysis apparatus. The measurement especially may include an analysis of a sample stored within the sample acquiring device.

If the first portion of the activating element protrudes into the reception recess, the first portion forms an obstacle which partially blocks the path of the sample acquiring device on the way to its intended measurement position. However, the first portion of the activating element can be pushed out of the way, especially out of the reception recess, by the sample acquiring device. In particular, the activating element may be an elastic and flexible part. Thus, the sample acquiring device may push away the first portion of the activating element in a direction towards the measurement triggering element. By this, the activating element may be brought into its activating position out of a non-activating position. As a result, the activating element may push the measurement triggering element, especially a button. By pushing the measurement triggering element, a measurement of the analysis apparatus may be activated.

The sample acquiring device holder enables that a measurement will not start unless the sample acquiring device with the blood sample is in the correct position. You cannot start a measurement if you accidently come in contact with another part of the analysis apparatus. Thus, an unintentional activation of a measuring may be prevented, as the sample acquiring device must be in its correct (i.e. in its intended) measurement position to do so.

The sample acquiring device holder also enables to shorten the measurement duration and, thus, to increase speed. An operator (e.g. a nurse) of the analysis apparatus does not have to let go of the sample acquiring device when performing a measurement. Usually, the operator handles the analysis apparatus close to a patient. So, the operator can e.g. prick a fingertip of the patient, fill a sample acquiring device with blood from the fingertip and then push the sample acquiring device into the sample acquiring device holder being inserted within the analyzing apparatus. After the measurement has been completed, the operator may simply and quickly pull the sample acquiring device out of the sample acquiring device holder, while the results of the measurement will be available immediately. This means that the operator can hold the sample acquiring device the whole time from pricking the patient's fingertip to throwing the sample acquiring device away after having completed the measurement procedure. The effect of not being able to start a measurement before the sample acquiring device is in the correct position ensures that no erroneous results are shown to the operator. Either the sample acquiring device is in the correct place and you will obtain a result, or the sample acquiring device is not in the correct place and no measurement will be performed.

In one embodiment, the activating element comprises an arm shaped element. The arm shaped element can comprise an upper arm element and a forearm element. The upper arm element and the forearm element can be connected in an elbow portion of the arm shaped element in a one-piece manner, especially rigidly. A first end portion of the arm shaped element, especially a distal end portion of the forearm element, can protrude into the reception recess, especially close to a bottom area of the housing. A second end portion of the arm shaped element, especially a distal end portion of the upper arm element, can be connected—pivotably or at least substantially rigidly—with an upper part of the reception part. The elbow portion of the arm shaped element can be adapted to activate the measurement triggering element, if the activating element is in its activating position, such that the measurement triggering element activates a measurement of the analysis apparatus. This embodiment provides a simple and reliably mechanical construction for detecting the correct position of the sample acquiring device and for automatically starting an analysis of a sample stored within the sample acquiring device.

Alternatively the activating element may be a simple bar. The bar may comprise a chamfered end portion which protrudes into the reception recess of the sample acquiring device holder and which is directed to a sample acquiring device. The sample acquiring device may push the chamfered end portion of the bar, such that the bar is moved towards the measuring triggering element and pushes the latter to start the measuring of the analysis apparatus. Furthermore, the analysis apparatus may comprise a spring element which is adapted to move the bar back, such that the chamfered end portion protrudes into the reception recess again.

The sample acquiring device holder can further comprise a reception part which forms the reception recess for receiving the sample acquiring device. The reception part can be made of a plastic material. The activating element, especially the arm shaped element, can be attached to the reception part in a one-piece manner. Thus, the activating element can be made of the same material as the reception part, especially made of a plastic material. Said attachment can especially be implemented in a substantially rigidly manner.

Furthermore, the activating element, especially the arm shaped element, may comprise a first plastic material and a second plastic material being different from the first plastic material. Especially, the second plastic material can be included along the activating element, especially along the arm shaped element. This contributes to make the activating element, especially the arm shaped element, more flexible.

The reception part can be made of a first material and the activating element, especially the arm shaped element, can be made of a second material. The first material can be a first plastic material, and the second material can be a second plastic material. Especially, the first plastic material can be a different material than the second plastic material, such that the activating element, especially the arm shaped element is provided with high flexibility. Alternatively, the first plastic material also be the same than the second plastic material.

In another embodiment, the activating element is pivotably attached to the reception part. By pivotably attaching the activating element, especially the arm shaped element, to the reception part, flexibility of the activation element can be enhanced. The activating element, especially the arm shaped element, can be pivotably attached to the reception part by means of a hinge. This hinge can be a separate hinge which is connected to the reception part on the one side and to the activating element, especially the arm shaped element, on the other side. Alternatively, the hinge can be formed by the reception part and by the activating element, especially by the arm shaped element. For example, the activating element, especially the arm shaped element, can form a shaft while the reception part forms a socket for accommodating the shaft. Both the activating element, especially the arm shaped element, and the reception part can be made of a same plastic material.

In another embodiment, a metal pin may be attached to the reception part. The activating element may be made of a plastic material and may comprise a recess corresponding to the size and shape of the pin. Further, the pin may be inserted into the recess such that the activating element is pivotably attached to the reception part.

In another embodiment, the activating element may be made of a metal material, and the activating element may be attached to the reception part, especially in a rigid manner. The reception part may be made of a plastic material. The metal activating element comprises a particularly high stability and elasticity. The metal activating element can be made relatively thin, especially compared to an activating element made of a plastic material.

According to state of the art analysis apparatuses, the sample acquiring device must be inserted into a compartment. This compartment usually is accessible only, if an opening/closing element is brought into an open position, whereas—when brought into a closed position—the opening/closing element closes the compartment such that the sample acquiring device cannot be inserted into the compartment. The compartment may be formed and arranged such that it provides a space for a accommodating of the sample acquiring device in its intended measurement position within the analysis apparatus, wherein the opening/closing element may secure the sample acquiring device in its intended measurement position within the analysis apparatus. However, this process of opening the opening/closing element, inserting the sample acquiring device into the compartment in the intended position and closing the opening/closing element again may take a lot of time.

Thus, there is a need for a faster handling and operation of an analysis apparatus. Therefore, according to another embodiment, the sample acquiring device holder may further comprise a guiding structure. The guiding structure may comprise a first rail and a second rail, wherein the first rail of the guiding structure of the sample acquiring device holder corresponds to a first groove of the sample acquiring device and wherein the second rail of the guiding structure of the sample acquiring device holder corresponds to a second groove of the sample acquiring device. Alternatively, the guiding structure may comprise a first groove and a second groove, wherein the first groove of the guiding structure of the sample acquiring device holder corresponds to a first rail of the sample acquiring device and wherein the second groove of the guiding structure of the sample acquiring device holder corresponds to a second rail of the sample acquiring device. The guiding structure may be adapted for inserting the sample acquiring device into the intended measurement position within the reception recess, such that the sample acquiring device protrudes out of the sample acquiring device holder and out of the analysis apparatus, if the sample acquiring device is in its intended measurement position within the reception recess.

This embodiment enables that the sample acquiring device only must be introduced into the guiding structure and to be pushed into the sample acquiring device holder, until the sample acquiring device is in its intended measurement position. This can be done in a single step. Because the sample acquiring device still protrudes out of the sample acquiring device holder and the analysis apparatus when being brought into its intended measurement position, the sample acquiring device can be inserted manually without any tools or aids. By means of the activating element it can be easily ensured, that the sample acquiring device is in its intended measurement position within the sample acquiring device holder and within the analysis apparatus, also. It is no longer necessary to laboriously open and close an opening/closing element to bring and secure the sample acquiring device in its intended position. Thus, a particularly fast handling and operation of the analysis apparatus are enabled. Especially, the measurement duration—especially also including the inserting of the sample acquiring device into the sample acquiring device holder—may be shortened.

According to a second aspect of the invention, an analysis apparatus is provided. The analysis apparatus may comprise a housing, a sample acquiring device holder according to the first aspect of the invention and a measurement triggering element, especially a button. The sample acquiring device holder may be adapted to be arranged within a recess of the housing such that the activating element of the sample acquiring device holder is adapted to activate the measurement triggering element, if the activating element is in its activating position, such that the measurement triggering element activates a measurement of the analysis apparatus.

The analysis apparatus may be adapted to analyse a blood sample which is stored within a sample acquiring device inserted within the reception recess of the sample acquiring device holder. The analysis of the blood sample may include a hemoglobin determination, blood glucose determination or a white blood cell count. Especially, the analysis apparatus may be adapted to conduct a quantitative hemoglobin determination in undiluted, unhemolyzed whole blood as described e.g. in EP 1 456 649 B1 of the applicant. Alternatively, the analysis apparatus may be adapted to analyse plasma, serum, urine, milk, waste water or similar substances which are stored within a sample acquiring device inserted within the reception recess of the sample acquiring device holder.

In an embodiment, the analysis apparatus may further comprise a magnet detecting element, e.g. a metal bar. The magnet detecting element may be adapted to detect a magnetic field of a magnet of the sample acquiring device holder. Further, the analysis apparatus may be ready for a measurement, when the sample acquiring device holder is arranged within the recess of the housing. This simple arrangement of a magnet and a magnet detecting element enables a reliable detection, whether the sample acquiring device holder is arranged within the sample acquiring device holder and within the analysis apparatus, or not. Thus, the analysis apparatus can automatically switch over into a "ready to measure" modus, if the analysis apparatus detects, that the sample acquiring device holder is within the recess of the housing (or that the magnet is within the sensing range of the magnet detecting element). If then a sample acquiring device is pushed into the reception recess of the sample acquiring device holder, such that the sample acquiring device is its intended measurement position, the measurement will be started by the activating device which pushes the measurement triggering device.

According to a third aspect of the invention a method for analysing a blood sample which is stored within a sample acquiring device is provided. The method may comprise providing an analysis apparatus according to the second aspect of the invention. The sample acquiring device holder of the analysis apparatus may be inserted into the housing of the analysis apparatus. Further, a sample acquiring device may be provided, wherein a blood sample may be stored within the sample acquiring device. Also, the sample acquiring device may be inserted into the intended position within the reception recess of the sample acquiring device holder. Thereby, the activating element of the sample acquiring device holder is moved into its activating position by the sample acquiring device, such that the activating element activates the measurement triggering element of the analysis apparatus. As a result, the measurement triggering element activates a measurement of the analysis apparatus. The analysis of the blood sample may include a hemoglobin determination, blood glucose determination or a white blood cell count. Especially, the analysis may comprise a quantitative hemoglobin determination in undiluted, unhemolyzed whole blood. Such a determination method is described e.g. in EP 1 456 649 B1 of the applicant.

These and other aspects of the invention will be apparent from and elucidated with reference to the embodiments described hereinafter.

BRIEF DESCRIPTION OF THE DRAWING

In the following description, exemplary embodiments of the invention are explained with reference to the accompanying drawing, wherein the same or similar elements are provided with the same reference sign.

DETAILED DESCRIPTION OF EXEMPLARY EMBODIMENTS

Figure 1:
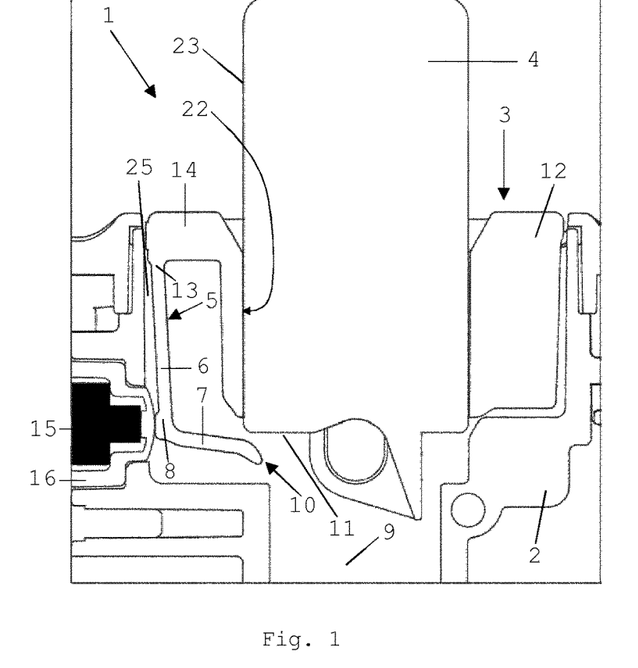
FIG. 1 shows a cross-sectional view of a part of an analysis apparatus with a sample acquiring device in a holder being in accordance with a first embodiment of the invention, wherein the sample acquiring device is not in an intended measurement position within the holder yet.
Figure 2:
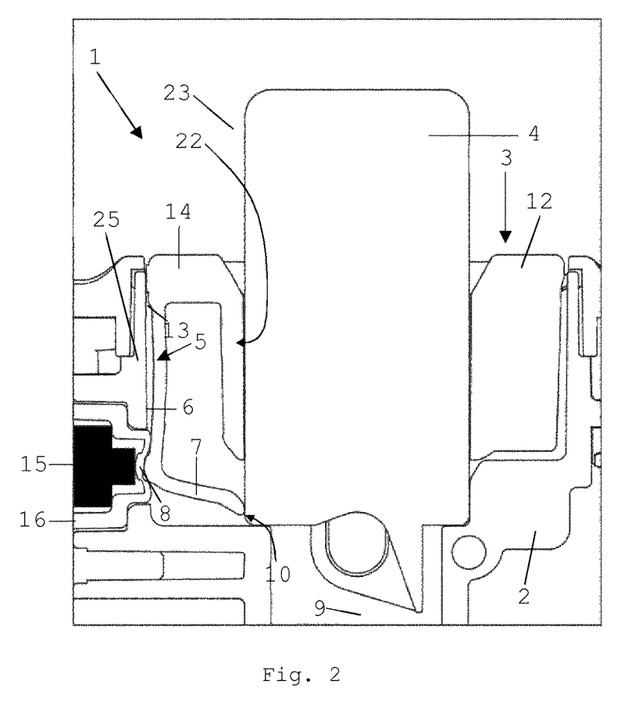
FIG. 2 shows a cross-sectional view of the analysis apparatus as per FIG. 1, wherein the sample acquiring device is now in its intended measurement position within the holder.

FIGS. 1 and 2 show a part of an analysis apparatus 1, a housing 2, a sample acquiring device holder 3 and a sample acquiring device 4. The sample acquiring device holder 3 is removably accommodated within a recess 25 of the housing 2.

In the shown example, the sample acquiring device 4 is a microcuvette. Thus, the sample acquiring device is referred to as a "microcuvette 4" in the following. Accordingly, the sample acquiring device holder is referred to as a "microcuvette holder 3" in the following. However, the sample acquiring device alternatively also may be e.g. a spectrophotometry cuvette, a sample tube or an EPPENDORF® tube, and especially the sample acquiring device holder 3 may be designed to receive such an alternative sample acquiring device as will be described in the following.

The microcuvette holder 3 comprises an activating element 5. In the shown example, the activating element comprises an arm shaped element with an upper arm element 6 and a forearm element 7. The upper arm element 6 and the forearm element 7 are connected in an elbow portion 8 of the arm shaped element in a one-piece manner.

Close to a bottom area 9 of the housing 2, a first end portion 10 of the arm shaped element, in the shown embodiment a distal end portion 10 of the forearm element 7, protrudes into a reception recess 11, which is formed by a reception part 12 of the microcuvette holder 3. The shape and dimensions are designed such that the microcuvette 4 can be pushed into the reception recess 11 to start a measurement and also to be pulled out of the reception recess 11 again.

In the shown example, a second end portion 13 of the arm shaped element, especially a distal end portion 13 of the upper arm element 6, is connected with an upper part, which may be called a shoulder part 14, of the reception part 12 in a one-piece manner. Although the second end portion 13 of the arm shaped element may be substantially rigidly connected to the shoulder part 14 of the reception part 12 of the microcuvette holder 3, the arm shaped element may be a flexible and elastic part that may be pivoted to some extent around the shoulder part 14.

Figure 14:
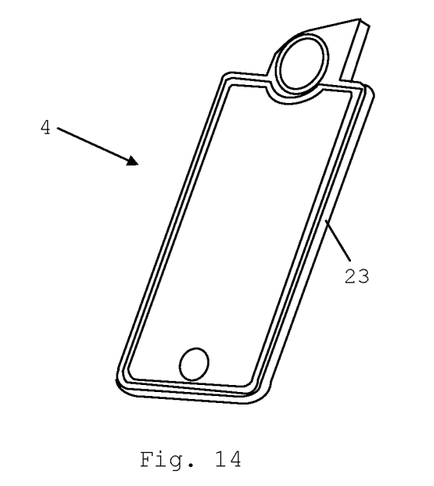
FIG. 14 shows a cross-sectional view of a sample acquiring device for being inserted into a holder according to an embodiment of the present invention.

The reception part 12 of the microcuvette holder 3 provides a guiding structure 22, in the shown example in form of two inner guiding surfaces each corresponding to an outer side surface 23 of the microcuvette 4 (see also FIG. 14). Alternatively, the guiding structure e.g. may be comprise at least one rail or groove corresponding to a groove respectively rail of the microcuvette 4. The guiding structure 22 is adapted for guiding the microcuvette 4 while the microcuvette 4 is inserted into the intended measurement position within the reception recess 11. In the shown example, the guiding structure 22 is adapted to guide the microcuvette 4 when being inserted into the microcuvette holder 3, such that the microcuvette 4 protrudes out of the microcuvette holder 3 and out of the analysis apparatus 1, if the microcuvette 4 is in its intended measurement position within the reception recess 11, as it is shown in FIG. 2. Thereby, it is enabled that the microcuvette 4 only must be introduced and pushed into the guiding structure of the microcuvette holder 3 until the microcuvette 4 is in its intended position. As will be described in the following, this is sufficient to correctly insert the microcuvette 4 into the measurement apparatus 1 and to start a measurement.

In the shown example, the microcuvette holder 3 with its arm shaped element and with its reception part 12 is made of a plastic material. In FIG. 1, the microcuvette 4 is not in contact with the distal end portion 10 of the forearm element 7 and is not yet pushed as far into the reception recess 11 as to reach its intended measurement position. The arm shaped element is in a non-activating position, in which the distal end portion 10 of the forearm element 7 is an obstacle which partially blocks the path of the microcuvette 4 on the way to its intended measurement position.

However, the arm shaped element may be an elastic and flexible part. Thus, the microcuvette 4 can push away the distal end portion 10 of the forearm element 7 in a lateral direction (to the left in FIGS. 1 and 2) when being pushed further into the reception recess 11, as it is shown in FIG. 2, which shows the microcuvette 4 is in its intended measurement position. In particular, the arm shaped element may be pivoted around the shoulder part 14 clockwise according to FIGS. 1 and 2. Thereby, especially the elbow portion 8 may be moved laterally (to the left in FIGS. 1 and 2). As a result, the elbow portion 8 may push a measurement triggering element, in the shown example a button 15. By pushing the button 15 a measurement of the analysis apparatus 1 may be activated. For sealing the housing 2, a membrane 16 is positioned between the elbow portion 8 and the button 15 in the shown example. Thus, the elbow portion 8 may push the button 15 indirectly via the membrane 16.

The analysis apparatus 1 may be adapted to analyse a blood sample which is stored within the microcuvette 4, when the microcuvette 4 is in its intended measurement position within the reception recess 11 of the microcuvette holder 3. The analysis of the blood sample may include a hemoglobin determination, blood glucose determination or a white blood cell count. Especially, the analysis apparatus 1 may be adapted to conduct a quantitative hemoglobin determination in undiluted, unhemolyzed whole blood as described e.g. in EP 1 456 649 B1 of the applicant. Alternatively, the analysis apparatus may be adapted to analyse plasma, serum, urine, milk, waste water or similar substances which are stored within a sample acquiring device inserted within the reception recess of the sample acquiring device holder.

Figure 3:
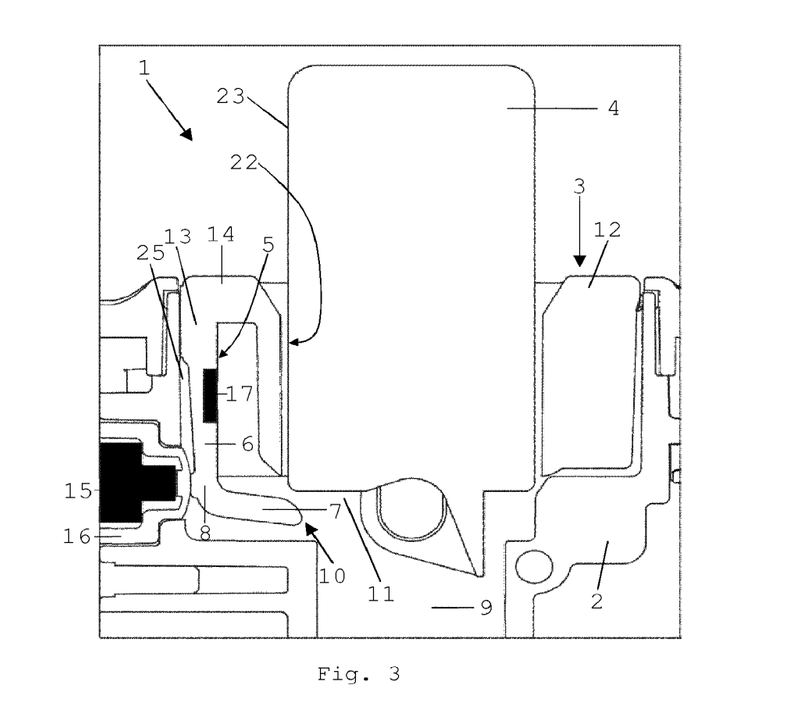
FIG. 3 shows a cross-sectional view of a part of an analysis apparatus with a sample acquiring device in a holder being in accordance with a second embodiment of the invention, wherein the sample acquiring device is not in an intended measurement position within the holder yet.
Figure 4:
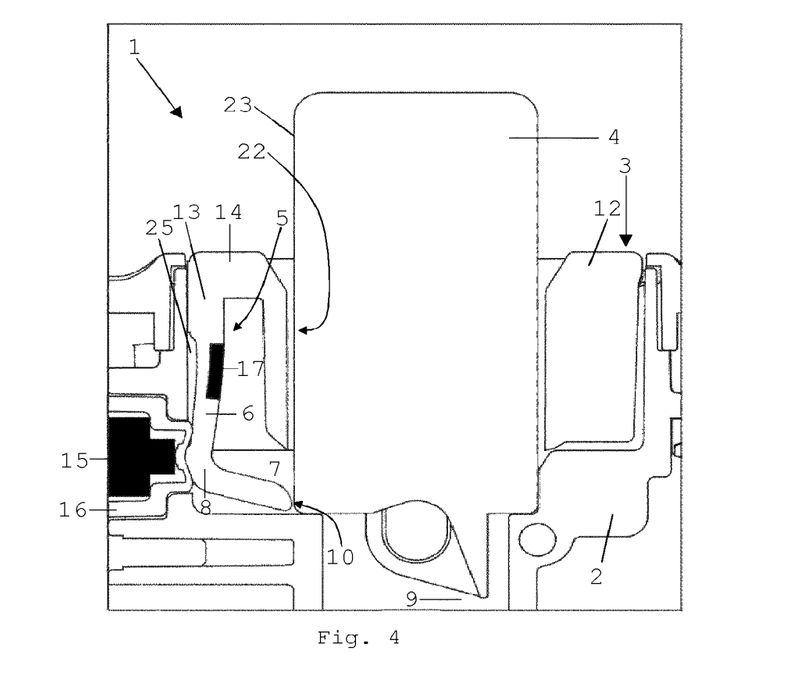
FIG. 4 shows a cross-sectional view of the analysis apparatus as per FIG. 3, wherein the sample acquiring device is now in its intended measurement position within the holder.

The embodiment shown by FIGS. 3 and 4 substantially has the same functionality than that as per FIGS. 1 and 2. Deviating from the embodiment as per FIGS. 1 and 2, the upper arm element 6 as per FIGS. 3 and 4 is thicker. Further in difference, the arm shaped element as per FIGS. 3 and 4 comprises a first plastic material, which builds the forearm element 7 and the elbow portion 8. The reception part 12 may be made of the first plastic material, too. Also, the upper arm element 6 may be substantially made of the first plastic material. However, a flexibility portion 17 extending along the upper arm element 6 may be made of a second plastic material which is different from the first plastic material. This second plastic material may contribute to make the arm shaped element more flexible.

Figure 5:
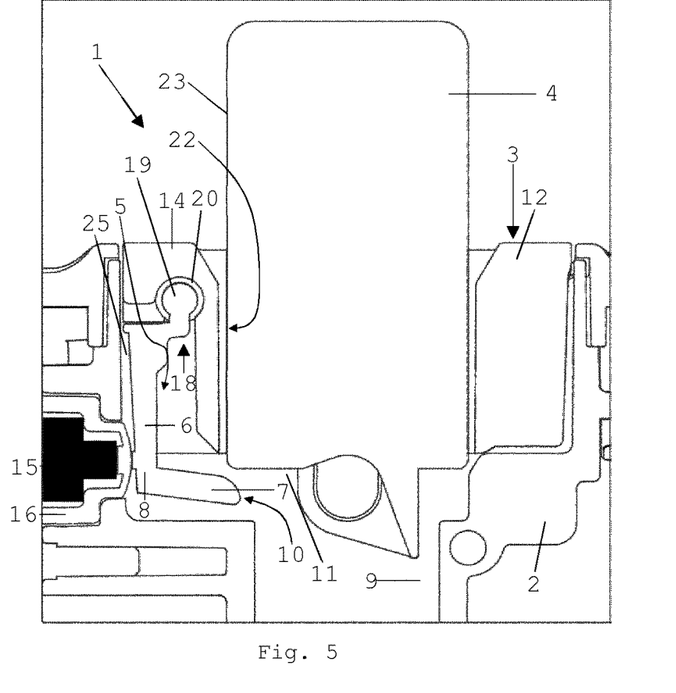
FIG. 5 shows a cross-sectional view of a part of an analysis apparatus with a sample acquiring device in a holder being in accordance with a third embodiment of the invention, wherein the sample acquiring device is not in an intended measurement position within the holder yet.
Figure 6:
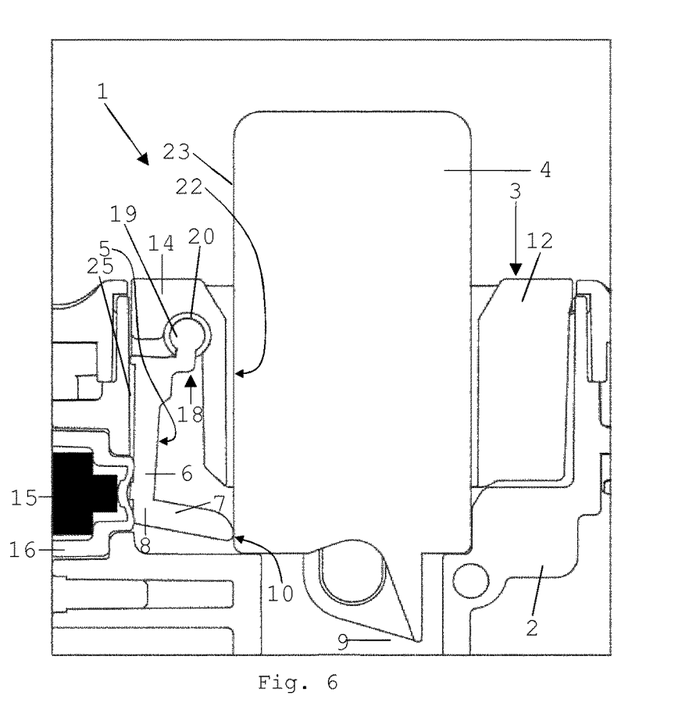
FIG. 6 shows a cross-sectional view of the analysis apparatus as per FIG. 5, wherein the sample acquiring device is now in its intended measurement position within the holder.

The embodiment shown by FIGS. 5 and 6 substantially has the same functionality than that as per FIGS. 1 and 2. However, according to the embodiment as per FIGS. 5 and 6, the arm shaped element is pivotably attached to the shoulder part 14 of the reception part 12. The upper arm element 6 is pivotably attached to the shoulder part 14 by means of a hinge 18. In the shown embodiment, the hinge 18 is formed by the upper arm element 6 and by the shoulder part 14. The upper arm element 6 forms a shaft 19 and the shoulder part 14 forms a socket 20 for accommodating the shaft. Both the arm shaped element and the reception part 12 can be made of a same plastic material.

Figure 7:
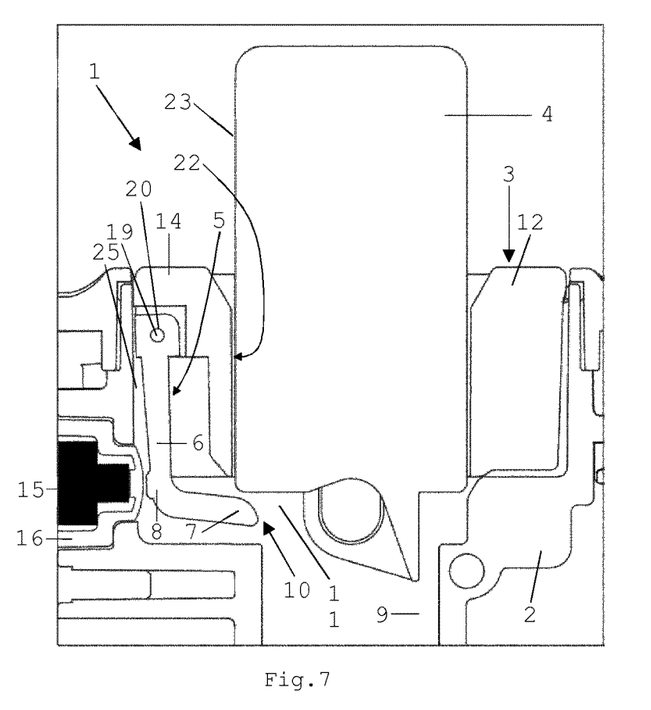
FIG. 7 shows a cross-sectional view of a part of an analysis apparatus with a sample acquiring device in a holder being in accordance with a fourth embodiment of the invention, wherein the sample acquiring device is not in an intended measurement position within the holder yet.
Figure 8:
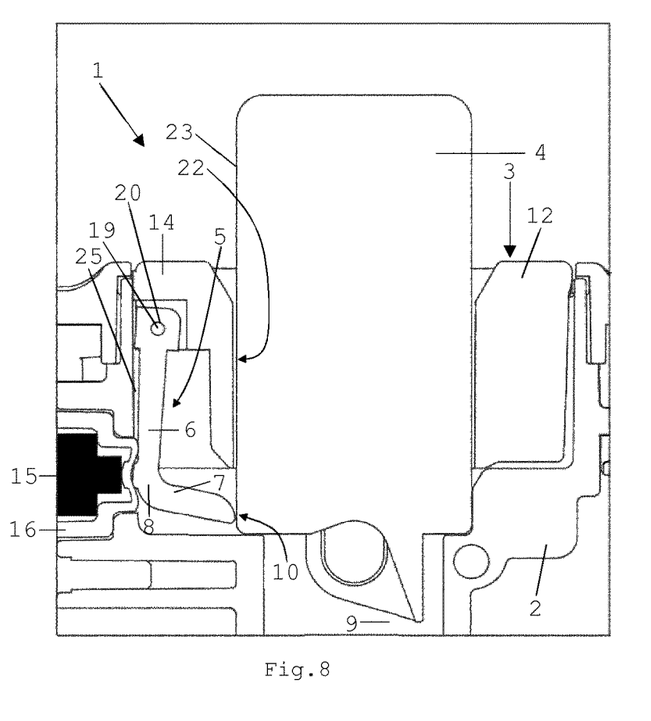
FIG. 8 shows a cross-sectional view of the analysis apparatus as per FIG. 7, wherein the sample acquiring device is now in its intended measurement position within the holder.
Figure 9:
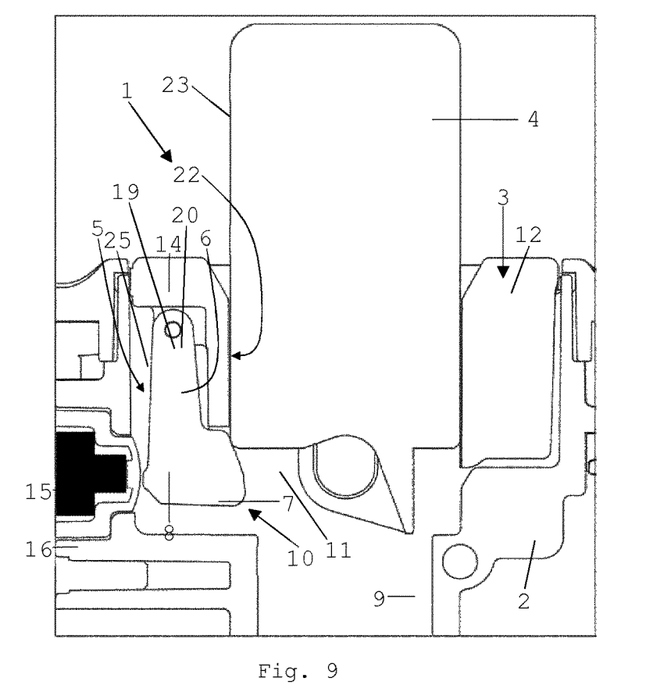
FIG. 9 shows a cross-sectional view of a part of an analysis apparatus with a sample acquiring device in a holder being in accordance with a fifth embodiment of the invention, wherein the sample acquiring device is not in an intended measurement position within the holder yet.
Figure 10:
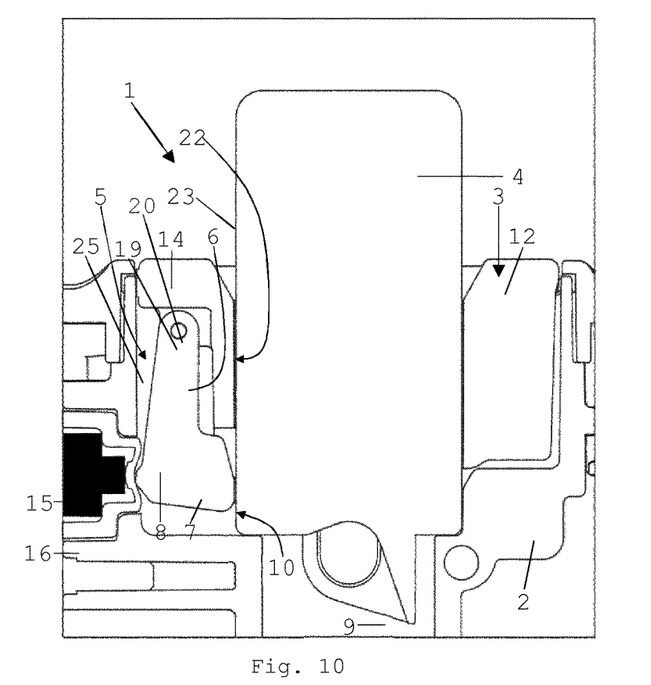
FIG. 10 shows a cross-sectional view of the analysis apparatus as per FIG. 9, wherein the sample acquiring device is now in its intended measurement position within the holder.

FIGS. 7 and 8 as well as 9 and 10 also show embodiments according to which the arm shaped element is pivotably attached to the shoulder part 14 of the reception part 12 by means of a hinge. However, in the embodiments as per FIGS. 7 to 10, the shoulder part 14 forms a metal pin 19 and upper arm element 6 forms a socket 20 for accommodating the pin. The rest of the arm shaped element and the reception part 12 can be made of a same plastic material.

Figure 11:
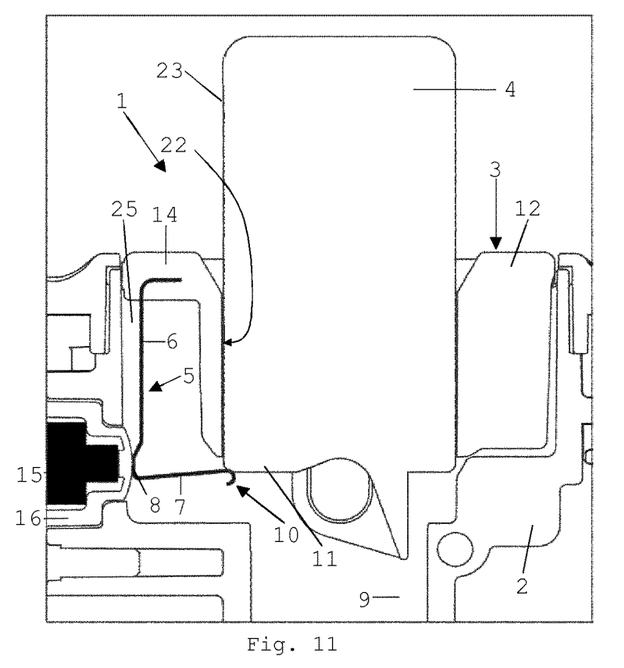
FIG. 11 shows a cross-sectional view of a part of an analysis apparatus with a sample acquiring device in a holder being in accordance with a sixth embodiment of the invention, wherein the sample acquiring device is not in an intended measurement position within the holder yet.
Figure 12:
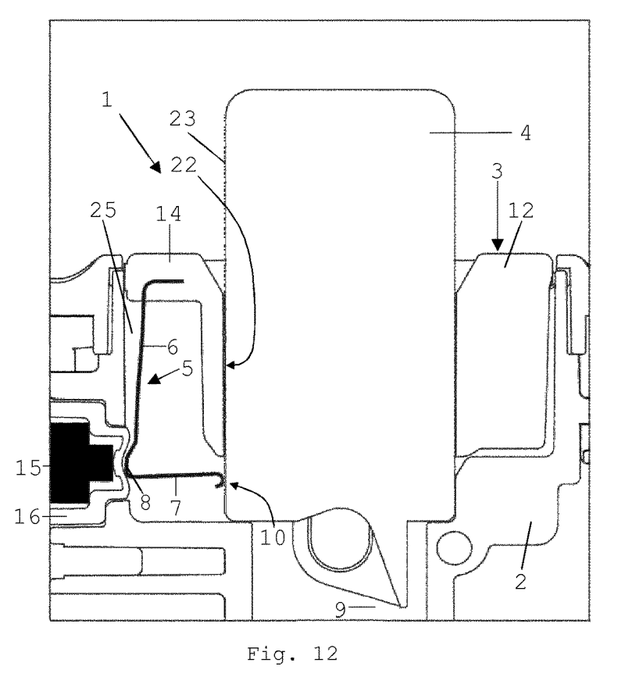
FIG. 12 shows a cross-sectional view of the analysis apparatus as per FIG. 11, wherein the sample acquiring device is now in its intended measurement position within the holder.

FIGS. 11 and 12 show an embodiment, wherein the arm shaped element is made of a metal material. The upper arm element 6 of the arm shaped element is rigidly attached to the shoulder part 14 of the reception part 12. The metal activating element 5 comprises a particularly high stability and elasticity. The metal activating element 5 can be made relatively thin, especially compared to an activating element 5 made of a plastic material as per FIGS. 1 to 10. The reception part 12 can be made of a plastic material.

Figure 13:
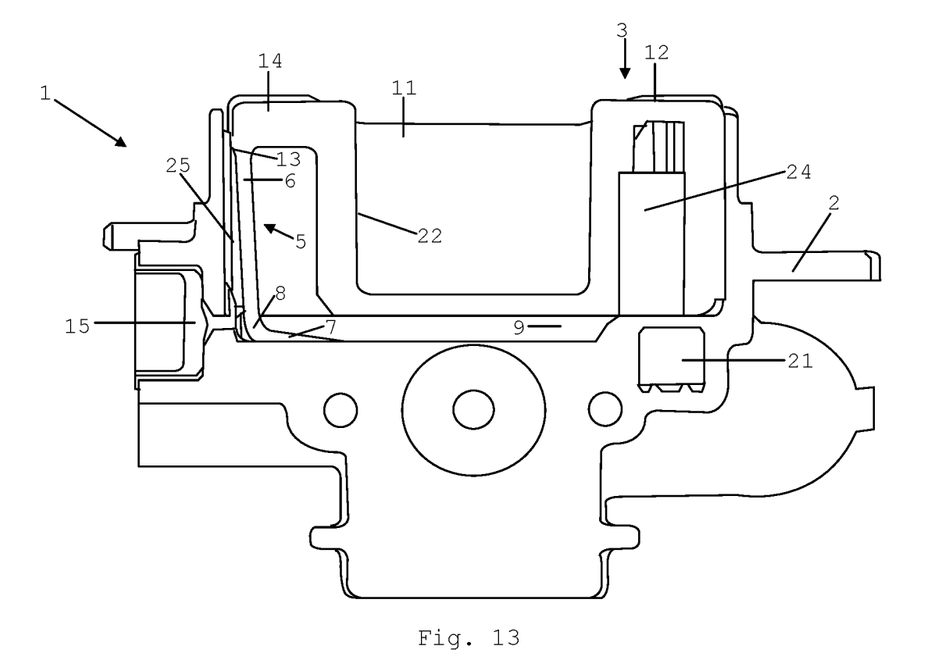
FIG. 13 shows a cross-sectional view of a part of an analysis apparatus with a sample acquiring device holder being in accordance with a seventh embodiment of the invention, wherein the holder comprises a magnet and wherein the analysis apparatus comprises a metal bar.

FIG. 13 shows another analysis apparatus 1 which substantially has the same functionality than that as per FIGS. 1 and 2. Additionally, the analysis apparatus as per FIG. 13 may comprise a magnet detecting element, in the shown example in the form of a metal bar 21. In the shown example, the metal bar 21 is accommodated within a recess of the housing 2. Further, the microcuvette holder 3 may comprise a magnet 24. In the shown example, the magnet 24 is accommodated within a recess formed by the reception part 12. FIG. 13 depicts the microcuvette holder 3 being inserted into an intended position within the recess 25 of the housing 2 of the analysis apparatus 1. In this position, the magnet 24 is in vicinity of the metal bar 21, such that a magnetic field of the magnet 24 may be detected by the metal bar. Therefore, by means of the magnet detecting element 21, the analysis apparatus 1 may be adapted to detect the magnet 24 of the microcuvette holder 3, when the microcuvette holder 3 is arranged within the recess 25 of the housing 2. If the analysis apparatus 1 detects this, it may automatically switch over into a modus, in which the analysis apparatus 1 is ready for a measurement.

FIG. 14 shows a microcuvette 4 suitable and adapted for being used in one of the microcuvette holders 3 and analysis apparatuses as per FIGS. 1 to 13.

Figure 15:
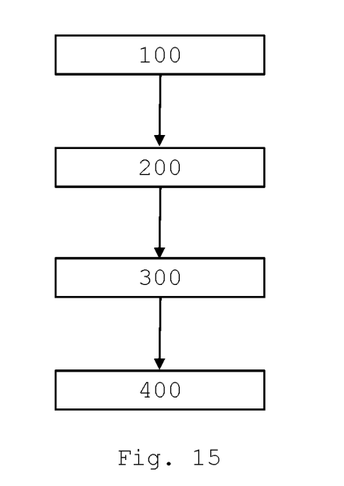
FIG. 15 shows a flow chart of a method for analysing a blood sample which is stored within a sample acquiring device according to an exemplary embodiment of the invention.

FIG. 15 shows a flow chart of a method for analysing a blood sample which is stored within a sample acquiring device 4. In a first method step 100, an analysis apparatus 1 as per one of the FIGS. 1 to 13 is provided. In a second step 200, a microcuvette holder 3 is inserted into the recess 25 of the housing 2 of the analysis apparatus 1.

Alternatively, the analysis apparatus 1 may also be provided with the microcuvette holder 3 already being inserted into the recess 25 of the housing 2. In a third step 300, a microcuvette 4 is provided, e.g. a microcuvette 4 as per FIG. 1 to 12 or 14, wherein a blood sample is stored within the microcuvette 4.

In a fourth step 400, the microcuvette 4 is inserted into the intended position within the reception recess 11 of the microcuvette holder 3. Thereby—as described above—the arm shaped element of the microcuvette holder 3 is brought into its activating position by the microcuvette 4. As a result, the elbow portion 5 pushes the button 15, such that the button 15 activates a measurement of the analysis apparatus 1. The measurement may include an analysis of the blood sample, e.g. a hemoglobin determination, blood glucose determination or a white blood cell count. Especially, the analysis may comprise a quantitative hemoglobin determination in undiluted, unhemolyzed whole blood. Such a determination method is described e.g. in EP 1 456 649 B1 of the applicant.

The invention claimed is:

1. A microcuvette holder for a housing of an analysis apparatus, the microcuvette holder comprising: an activating element and a microcuvette reception part forming a reception recess for receiving a microcuvette, wherein the activating element is made of a metal material, and wherein the activating element is attached to the microcuvette reception part, wherein the activating element is adapted to be moved into an activating position by the microcuvette when the microcuvette is inserted into an intended measurement position within the reception recess, wherein the activating element is adapted to activate a measurement triggering element of the analysis apparatus by movement of the activating element laterally when the activating element is in the activating position, wherein the activating element comprises an arm shaped element having an elbow portion, wherein a first end portion of the arm shaped element protrudes into the reception recess, wherein the elbow portion of the arm shaped element is adapted to activate the measurement triggering element by pushing when the activating element is in the activating position, and wherein the microcuvette holder is configured to be one or both of inserted and removed within a recess of the housing.

2. A microcuvette holder for a housing of an analysis apparatus, the microcuvette holder comprising:
an activating element, a reception recess for receiving a microcuvette, and a guiding structure,
wherein the activating element is adapted to be moved into an activating position by the microcuvette when the microcuvette is inserted into an intended measurement position within the reception recess,
wherein the guiding structure is adapted for inserting the microcuvette into the intended measurement position within the reception recess, such that the microcuvette protrudes out of the microcuvette holder and out of the analysis apparatus, when the microcuvette is in the intended measurement position within the reception recess, wherein the activating element is adapted to activate a measurement triggering element of the analysis apparatus by movement of the activating element laterally when the activating element is in the activating position, wherein the activating element comprises an arm shaped element having an elbow portion, wherein a first end portion of the arm shaped element protrudes into the reception recess, wherein the elbow portion of the arm shaped element is adapted to activate the measurement triggering element by pushing when the activating element is in the activating position, and wherein the microcuvette holder is configured to be one or both of inserted and removed within a recess of the housing.

3. The microcuvette holder according to claim 2, wherein the microcuvette holder comprises a reception part forming the reception recess for receiving the microcuvette, and wherein the activating element is attached to the reception part of the microcuvette holder in a one-piece manner, wherein the reception part comprises a shoulder part whereto the activating element is attached.

4. The microcuvette holder according to claim 3, wherein the reception part and the activating element are made of the same plastic material.

5. The microcuvette holder according to claim 3, wherein the arm shaped element further comprises an upper arm element and a forearm element, each being connected to the elbow portion in a one-piece manner, and wherein a distal end portion of the upper arm element is attached to the shoulder part.

6. The microcuvette holder according to claim 5, wherein the distal end portion of the upper arm element is substantially rigidly connected to the shoulder part.

7. The microcuvette holder according to claim 2, wherein the activating element comprises a first plastic material and a second plastic material different from the first plastic material.

8. The microcuvette holder according to claim 2, wherein the microcuvette holder comprises a microcuvette reception part forming the reception recess for receiving the microcuvette, and wherein the activating element is pivotably attached to the reception part.

9. The microcuvette holder according to claim 8, wherein the activating element is pivotably attached to the reception part by means of a hinge, and wherein the microcuvette reception part and the activating element are made of the same plastic material.

10. The microcuvette holder according to claim 8, wherein a metal pin is attached to the microcuvette reception part, wherein the activating element is made of a plastic material and comprises a recess corresponding to the size and shape of the pin, and wherein the pin is inserted into the recess such that the activating element is pivotably attached to the microcuvette reception part.

11. An apparatus for accommodating a sample for analysis comprising:

a housing, the microcuvette holder according to claim 2, and the measurement triggering element, wherein the microcuvette holder is adapted to be one or both of inserted and removed within the recess of the housing such that the activating element of the microcuvette holder is adapted to activate the measurement triggering element by pushing when the activating element is in the activating position.

12. The apparatus according to claim 11, wherein the apparatus is adapted to analyse a blood sample which is stored within the microcuvette inserted within the reception recess of the microcuvette holder.

13. The apparatus according to claim 11, the apparatus further comprising a magnet detecting element, wherein the magnet detecting element is adapted to detect a magnet of the microcuvette holder.

14. A method for manipulating a microcuvette within an apparatus, the method comprising:

providing the apparatus according to claim 11, inserting the microcuvette holder of the apparatus into the housing of the apparatus, wherein the microcuvette holder is configured to be one or both of inserted and removed within the recess of the housing, providing the microcuvette in which a blood sample is stored, and inserting the microcuvette into the intended measurement position within the reception recess of the microcuvette holder, thereby moving the activating element of the microcuvette holder into its activating position by the microcuvette, such that the activating element activates the measurement triggering element of the apparatus by movement of the activating element laterally.

15. The apparatus according to claim 11, wherein the measurement triggering element is a button.

16. The microcuvette holder according to claim 2, wherein the arm shaped element further comprises an upper arm element and a forearm element, each being connected to the elbow portion in a one-piece manner.

* * * * *